United States Patent
Thompson

(10) Patent No.: US 6,951,015 B2
(45) Date of Patent: Sep. 27, 2005

(54) PREFETCH INSERTION BY CORRELATION OF CACHE MISSES AND PREVIOUSLY EXECUTED INSTRUCTIONS

(75) Inventor: Carol L. Thompson, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 537 days.

(21) Appl. No.: 10/160,476

(22) Filed: May 30, 2002

(65) Prior Publication Data
US 2003/0225996 A1 Dec. 4, 2003

(51) Int. Cl.⁷ .................. G06F 9/45; G06F 12/00; G06F 15/00
(52) U.S. Cl. .................. 717/158; 711/213; 712/207; 712/237
(58) Field of Search .................. 717/151–161; 712/205–207, 227, 237, 239–240; 711/118, 123, 125, 126, 137, 136, 213

(56) References Cited

U.S. PATENT DOCUMENTS

| | | | | |
|---|---|---|---|---|
| 6,047,363 A | * | 4/2000 | Lewchuk | 711/213 |
| 2003/0084433 A1 | * | 5/2003 | Luk et al. | 717/158 |
| 2003/0101443 A1 | * | 5/2003 | Kosche et al. | 717/158 |
| 2003/0105942 A1 | * | 6/2003 | Damron et al. | 712/216 |
| 2003/0126591 A1 | * | 7/2003 | Wu et al. | 717/158 |
| 2003/0145314 A1 | * | 7/2003 | Nguyen et al. | 717/158 |
| 2003/0204840 A1 | * | 10/2003 | Wu | 717/158 |

* cited by examiner

Primary Examiner—Anthony Nguyen-Ba

(57) ABSTRACT

Method and apparatus for inserting prefetch instructions in an executable computer program. Profile data are generated for executed load instructions and store instructions. The profile data include instruction addresses, target addresses, data loaded and stored, and execution counts. From the profile data, recurring patterns of instructions resulting in cache-miss conditions are identified. Prefetch instructions are inserted prior to the instructions that result in cache-miss conditions for patterns of instructions recurring more than a selected frequency.

24 Claims, 3 Drawing Sheets

PREFETCH INSERTION BY CORRELATION OF CACHE MISSES AND PREVIOUSLY EXECUTED INSTRUCTIONS

FIELD OF THE INVENTION

The present invention generally relates to pre-fetching data in a computing arrangement, and more particularly to pre-fetching data by correlating cache misses and previously executed instructions.

BACKGROUND

Many computer systems provide a prefetch mechanism by which selected data is loaded into cache memory before it is referenced by a program in order to reduce the time the processor has to wait for data (prefetched "data" refers to both instructions and data). For example, a load instruction typically reads data referenced by a target address into a local processor register. If the referenced data is in cache memory, the processor spends less time waiting for the data. However, if the referenced data is not in cache memory (a "cache-miss" condition), the data is read from memory to the register and also stored in cache memory for subsequent references. In the case of a cache-miss, the processor spends more time waiting than if the data had been present in cache memory. Therefore, when the data is prefetched into cache memory, the waiting by the process is reduced.

Some known prefetch mechanisms attempt during program execution to predict which data to prefetch based on observed program behavior. When the prediction is correct, the processor spends less time waiting for data and therefore has improved throughput. However, when the prediction is incorrect and data is prefetched and not subsequently referenced, the errant prefetch unnecessarily consumes resources of the cache memory and memory bus. To further complicate matters, correctly predicting the data to load is made difficult in some cases because the address from which the data is to be loaded may not be available until it is too late to prefetch data.

A system and method that address the aforementioned problems, as well as other related problems, are therefore desirable.

SUMMARY OF THE INVENTION

In various embodiments, method and apparatus are provided for inserting prefetch instructions in an executable computer program. Profile data are generated for executed load instructions and store instructions. The profile data include instruction addresses, target addresses, data loaded and stored, and execution counts. From the profile data, recurring patterns of instructions resulting in cache-miss conditions are identified. Prefetch instructions are inserted prior to the instructions that result in cache-miss conditions for patterns of instructions recurring more than a selected frequency.

Various example embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments of the invention, a program is profiled or instrumented during execution to identify occurrences of patterns of program instructions and cache-miss conditions. The program is then modified with prefetch instructions inserted at points in the program that are selected based on the locations and occurrences of load/store instruction and cache-miss patterns. The example patterns sought in the various embodiments of the present invention involve the target address of a load/store instruction and a resulting cache-miss condition, and the target address or the data value of a previous load/store instruction. A pattern of one of these types is a candidate for insertion of a prefetch instruction if the number occurrences of the pattern exceeds a selected percentage threshold of the number of times the previous load/store instruction was executed. The prefetch of the required data is inserted following the previous load/store instruction.

There are two example patterns that relate to the target address of a previous load/store instruction and two patterns that relate to the data value of a previous load/store instruction. One pattern related to the target address is the target address of a load/store instruction being equal to the target address of a previous load/store instruction +/– an offset value. The other pattern is the target address of a load/store instruction being equal to the target address of a previous load/store instruction +/– the data value of the same or another previous load/store instruction. One pattern related to the data value of a previous load/store instruction is the target address of a load/store instruction being equal to the data value of a previous load/store instruction +/– an offset value. The other pattern is the target address of a load/store instruction being equal to the data value of a previous load/store instruction +/– the data value of the same or another previous load/store instruction.

Figure 1:
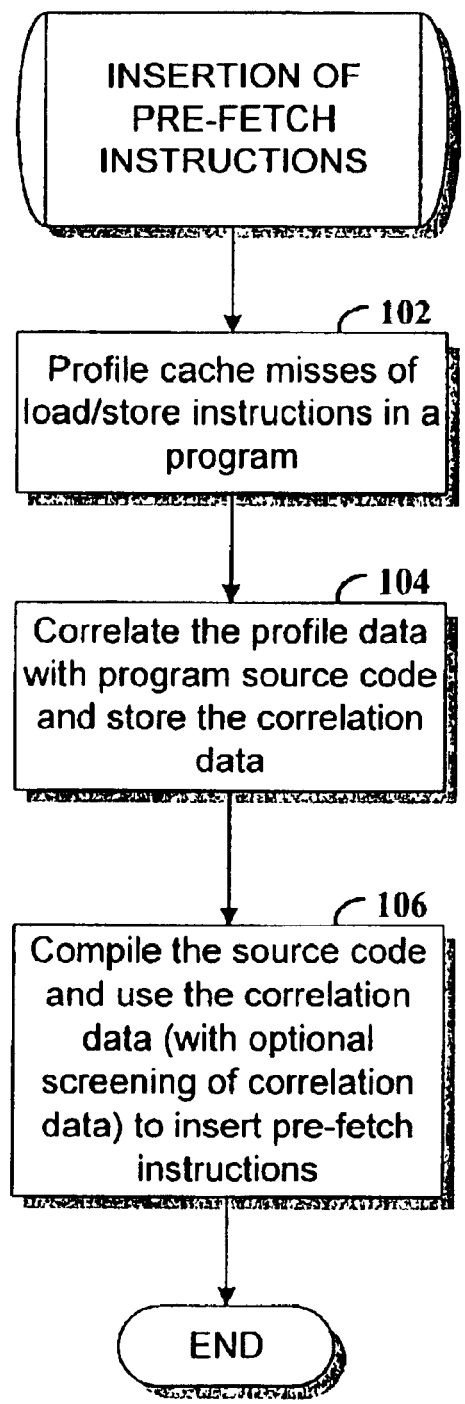
FIG. 1 is a flowchart of an example process for profiling a program and inserting prefetch instructions based on cache misses associated with load instructions and store instructions ("load/store instructions")

FIG. 1 is a flowchart of an example process for profiling a program and inserting prefetch instructions based on cache misses associated with load instructions and store instructions ("load/store instructions"). The process begins by profiling a program (step 102). In an example embodiment, a conventional software analysis tool such as the CALIPER™ tool from Hewlett-Packard is adapted to perform the required analysis. The CALIPER™ tool operates by attaching to an executable program and controlling execution of the program while gathering the desired profile data. The profiling tool gathers data that describes the occurrences of load/store instructions, associated cache-miss conditions, and occurrences of patterns that indicate suitability for insertion of prefetch instructions.

The patterns are then correlated with program source code in accordance with one embodiment of the invention (step 104). U.S. Pat. No. 6,275,981 to Buzbee, et al., entitled, "Method And System For Correlating Profile Data Dynamically Generated From An Optimized Executable Program With Source Code Statements" describes an example method for performing the correlation. Each pattern involves a "previous" load/store instruction, and each occurrence is correlated with the source code statement from which the previous load/store instruction was generated. The saved patterns and associated source code identification information is referenced herein as correlation data.

Figure 2:
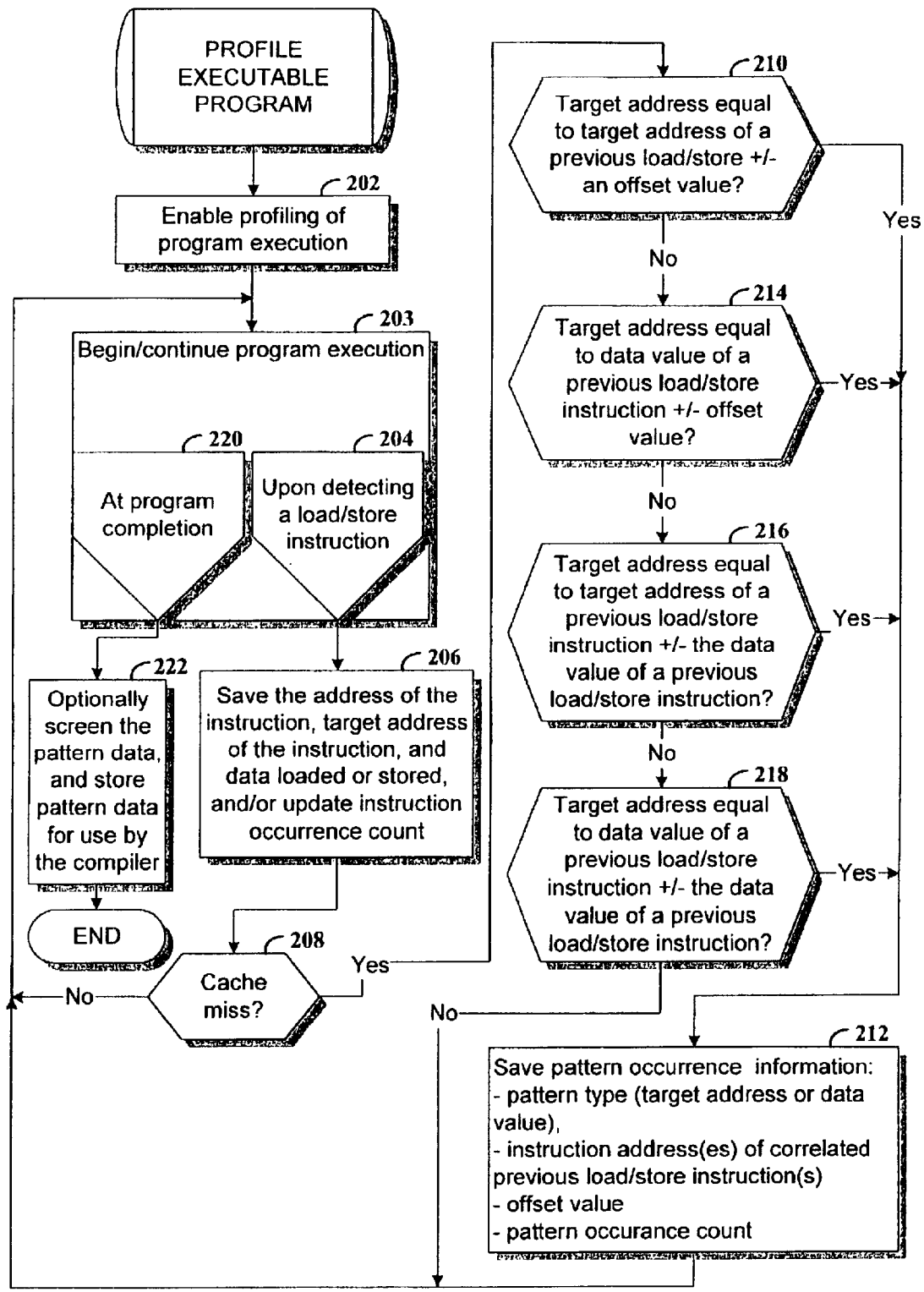
FIG. 2 is a flowchart of an example process for profiling a program in accordance with one embodiment of the invention.

In an alternative embodiment, the profiler tool not only gathers the profile data but also dynamically inserts prefetch instructions at selected locations. An example method for performing dynamic instrumentation (profiling) is described in the patent application entitled, "DYNAMIC INSTRUMENTATION OF AN EXECUTABLE PROGRAM" by Hundt et al., filed on Apr. 11, 2001, and having patent/application No. Ser. 09/833,248, the contents of which are incorporated herein by reference. The profiler gathers the profile data, for example as illustrated in FIG. 2. When a pattern occurs more than a selected threshold percentage of the number of times that the load/store was executed, a prefetch instruction is inserted to, be executed prior to the load/store instruction. It will be appreciated that before determining whether to insert a prefetch instruction relative to a pattern, the program is allowed to execute in order to accumulate a sufficient execution count for the load/store instruction.

In the embodiment where the compiler inserts prefetch instructions, the compiler recompiles the source code using the correlation data to insert prefetch instructions at the desired locations in the executable code (step 106). In one embodiment, the compiler determines whether to insert a prefetch instruction by screening the correlation data for patterns that meet selected criteria, for example, the threshold percentage described above. In another embodiment (described in FIG. 2), the pattern information is screened after profiling the program and before compilation. When the compiler reaches a source code statement that is correlated with a pattern occurrence, the prefetch instruction is generated to follow the other executable code generated for the statement.

FIG. 2 is a flowchart of an example process for profiling a program in accordance with one embodiment of the invention. During application runtime, the address, target address, and data loaded or stored for some number, for example, 10, of the most recent load/store instructions are saved. Each time a new load/store instruction is encountered and a cache-miss occurs, the target address is compared with each saved address and data value. Where a correlation is found, profile data for that pattern occurrence is updated. It will be appreciated that cache-miss conditions are (for most processors) only of interest for load instructions. However, both load and store instructions are tracked because a load instruction may correlate with a previous store instruction.

The process of gathering the profile data begins by enabling profiling of the program (step 202), for example by controlling program execution with an analysis program such as the CALIPER™ tool. The process then proceeds to begin program execution (step 203). When the tool detects a load or store instruction (step 204), information related to the instruction is saved (step 206). The information of interest includes the address of the instruction, the target address, and the data loaded or stored. In addition, an occurrence count is maintained for the instruction to count the number of times the instruction is encountered. In saving the instruction-related information, the information is saved for only the n most recently executed load/store instructions. It will be appreciated that the choice of n is influenced by the cost of profiling. This includes the cost of tracking the n most recent instructions, in addition to the cost of checking each cache miss against all n previous load/store instructions. In addition, the incremental value of the correlation data decreases as n grows large because the likelihood of useful correlation decreases as the separation between the instructions increases. The value of n is empirically derived and may vary with application domain.

If the load/store instruction also resulted in a cache miss (decision step 208), the process also checks for the occurrence of one of the example patterns described above (decision steps 210, 214, 216, and 218). It will be appreciated that the offset value used to detect patterns and store pattern information is limited to a selected range of values so every cache miss does not result in detecting a pattern. For example, for two load addresses, A and B, B can always be produced by adding the offset (B−A) to address A. However, if that offset is large, it is unlikely to be significant and yet result in a high frequency of matches. Not only would storing this correlation waste memory, but it may displace a more useful pattern because only limited number of patterns are saved.

If an occurrence of one of the pattern types is detected, pattern-specific information is saved (step 212). The saved information includes the pattern type (whether the occurrence relates to a target address or data value of the previous load/store instruction), the instruction address(es) of the correlated previous load/store instruction(s), the offset value, and the pattern occurrence count. Note that there may be more than one previous load/store instruction that satisfies the criteria. The purpose of the offset value is to provide the value that needs to be added to the target (data) address of the previous load/store instruction in order to generate the data address for the prefetch instruction. It will be appreciated that once a pattern is found, the number of times that the pattern recurs is counted, and the count is incremented rather than resaving the pattern information.

For patterns such as those described in step 214, the target address of the instruction resulting in a cache-miss condition is generally not constant. The process attempts to identify cases where, though not constant, the target address of the instruction resulting in the cache-miss condition is frequently equal to a previous data value (the data loaded/stored by a previous instruction) plus a constant offset. Because the previous data value is not expected to be constant, the target address "previous-data-value+constant offset" must be recomputed at runtime. In order to recompute the target address, the address of the instruction referencing the "previous-data-value" is saved, and at runtime the previous-data-value is added the offset value to produce the address to prefetch.

For patterns such as those described in step 218, the pattern information that is saved includes the addresses of two previous load/store instructions. From the two instruction addresses, the data values obtained by the two instructions at runtime can be used to compute the target address for the prefetch instruction.

To reduce storage requirements and compilation time, for each load/store instruction information is saved for only a limited number (e.g., 4) of different patterns. When a previously identified pattern for a load/store instruction recurs, the associated counter is incremented. If a new pattern is detected, the new pattern displaces a previously detected pattern with the lowest count.

If no pattern is detected, the process returns to continue program execution (step 203). When the program is done executing (step 220), the process optionally screens the pattern data (step 222). The screening of the pattern data may be performed either at the end of program execution and before storing the pattern data, or at compile time (when the compiler reads the pattern data). The pattern data are examined to identify frequently recurring patterns. If the count on any one pattern is greater than a selected threshold percentage of the execution count for the associated load/store instruction, the pattern information is stored for the compiler for inserting a prefetch instruction. Patterns that do not meet the threshold percentage are not stored for the compiler. The threshold percentage is in part determined, for example, by considering the cost of performing a prefetch (including utilization of memory bandwidth) versus the cost of a load instruction missing the cache memory.

Figure 3:
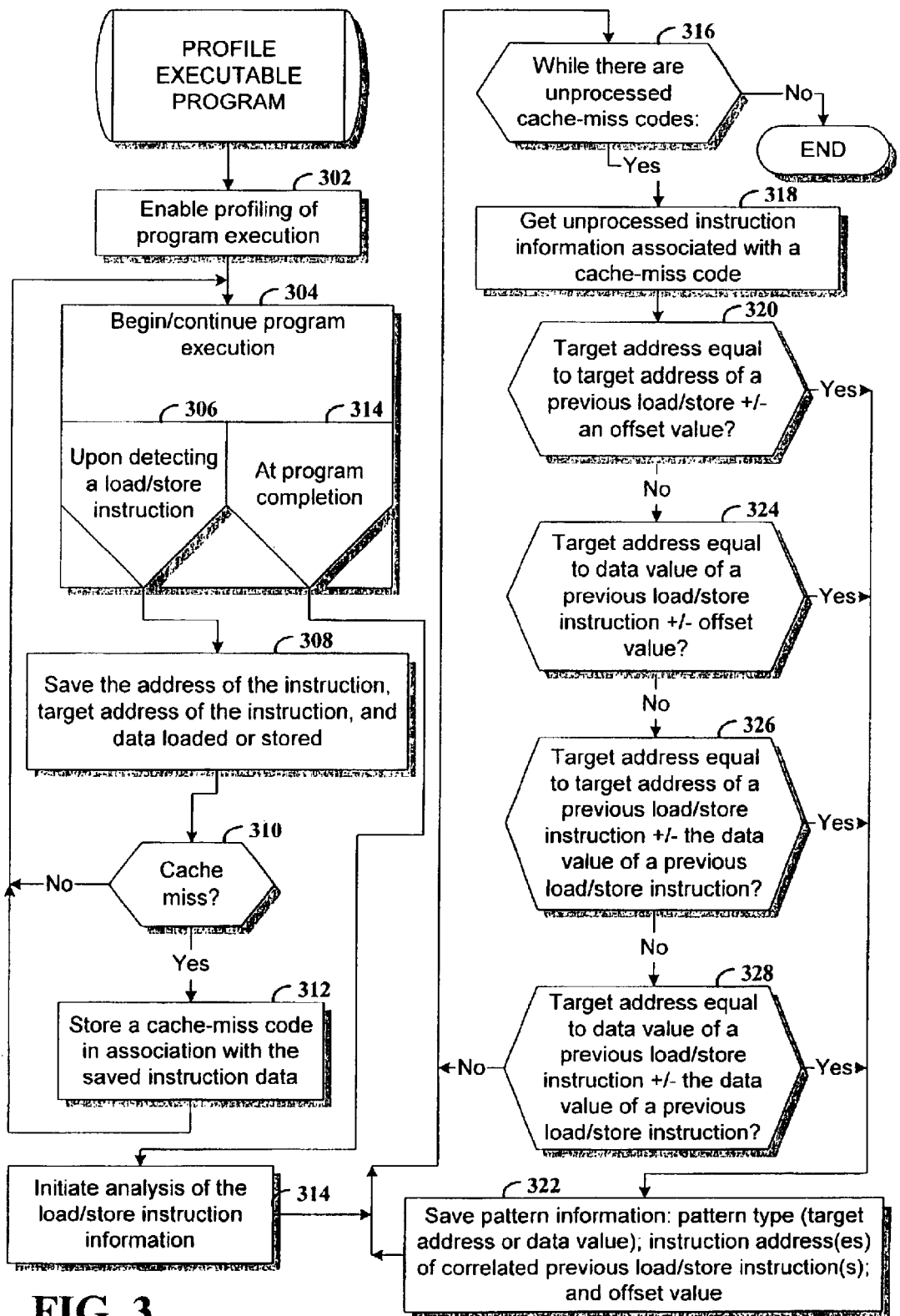
FIG. 3 is a flowchart of an example process for profiling a program in accordance with another embodiment of the invention.

FIG. 3 is a flowchart of an example process for profiling a program in accordance with another embodiment of the invention. In this embodiment, the target address and loaded/stored data are saved to a file for every load/store instruction performed during execution of the program. If the load/store instruction results in a cache miss, a cache-miss code is associated with the information saved for the load/store instruction. When program execution is complete, a post-execution tool examines the cache misses associated with load/store instructions to find patterns of load/store instructions and cache miss conditions, and the patterns are saved to a file.

Profiling of the program is enabled (step 302) as described above in FIG. 2. Upon detecting a load/store instruction (step 306), the process saves the address of the instruction, the target address, and the data loaded/stored (step 308). In this embodiment, the temporal correlation between instructions is maintained by the ordering of the records within the trace file. In the embodiment of FIG. 2, in contrast, the temporal correlation between the n previous load/store instruction(s) and the current instruction is implicit, as the correlation is made dynamically against only recent load/store instructions.

If the load/store instruction resulted in a cache-miss condition (decision step 310), a cache-miss code is stored in association with the saved instruction information (step 312). Both the load/store instruction information and the cache-miss code are stored in a manner that allows subsequent analysis of the information. For example, the information is stored in a file on magnetic storage media. The process then returns to continue execution of the program (step 304).

When execution of the program is complete, analysis of the load/store instruction information is initiated (step 314). Instruction information having an associated cache-miss code signals the process to check for a pattern. While there are still cache-miss codes that haven't been processed (decision step 316), the process obtains the unprocessed instruction information (having an associated cache-miss code) (step 318) and checks for a pattern (decision steps 320, 324, 326, and 328). If a pattern is found, the associated pattern information is saved (step 322). The pattern information includes the pattern type (target address or data value), the instruction address(es) of the correlated previous load/store instruction(s), the offset value, and the pattern occurrence count. In this embodiment, the offset value is limited to a selected number of instruction addresses, for example 64, to reduce the range of instructions considered in searching for a pattern. The process then returns to check for more unprocessed cache-miss codes and associated load/store instruction information.

Once all the load/store instruction information has been processed, the pattern information can be processed. The information can be processed either as part of the post-execution tool or by the compiler. As with the embodiment of FIG. 2, if the count on any one pattern is greater than a selected threshold percentage of the execution count for the associated load/store instruction, the pattern information is stored for the compiler for inserting a prefetch instruction. Patterns that do not meet the threshold percentage are not stored for the compiler. It will be appreciated that the occurrences of patterns and associated load/store instructions are counted using the saved instruction and pattern information.

A computer-readable medium may be configured with executable instructions for causing a computer to perform the various described methods for generating profile data of executed load instructions and store instructions, identifying from the profile data recurring patterns of instructions resulting in cache-miss conditions, and inserting prefetch instructions prior to the instructions that result in cache-miss conditions for patterns of instructions recurring more than a selected frequency.

In addition to the example embodiments described above, other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for inserting prefetch instructions in an executable computer program, comprising;
   generating profile data of executed load instructions and store instructions, including instruction addresses, target addresses, data loaded and stored, and execution counts;
   identifying from the profile data recurring patterns of instructions resulting in cache-miss conditions, wherein the patterns of instructions include,
      a first pattern having a target address of an instruction resulting in a cache-miss condition that is equal to a target address of a previous load instruction plus an offset value;
      a second pattern having a target address of an instruction resulting in a cache-miss condition that is equal to a target address of a previous load instruction minus an offset value;
      a third pattern having a target address of an instruction resulting in a cache-miss condition that is equal to a target address of a previous store instruction plus an offset value; and
      a fourth pattern having a target address of an instruction resulting in a cache-miss condition that is equal to a target address of a previous store instruction minus an offset value; and
   inserting prefetch instructions prior to the instructions that result in cache-miss conditions for patterns of instructions recurring more than a selected frequency.

2. The method of claim 1, further comprising:
   saving profile data for a selected number of most-recently executed load instructions and store instructions; and
   identifying the recurring patterns of instructions using the saved profile data while the program is executing.

3. The method of claim 1, further comprising:
   storing profile data for each executed load instruction and store instruction; and
   identifying the recurring patterns of instructions using the stored profile data after program execution is complete.

4. The method of claim 1, further comprising:
   storing pattern information for the patterns of instructions in a file, the pattern information including for each pattern a pattern type, an instruction address, an offset value, and a pattern occurrence count, wherein the pattern type indicates one of the first, second, third and fourth patterns, the instruction address is an address of one of the previous load instruction and previous store instruction, the offset value indicates a number of addresses separating the instruction resulting in the cache-miss condition and the one of the previous load instruction and previous store instruction, and the occurrence count indicates a total number of occurrences of the pattern; and identifying as qualifying patterns from the file of pattern information, patterns in which respective ratios of pattern occurrence counts to execution counts of associated previous load instructions and associated previous store instructions are greater than a threshold value.

5. The method of claim 4, wherein the executable program is generated from a source code program, the method further comprising:

determining correspondences between the qualifying patterns and source code statements; and inserting the prefetch instructions in the executable program during compilation using the correspondences.

6. The method of claim 4, further comprising:

for each previous load instruction, storing pattern information for a number of patterns that is limited to a selected number; and for each previous store instruction, storing pattern information for a number of patterns that is limited to a selected number.

7. The method of claim 1, wherein the patterns of instructions comprise:

a fifth pattern having a target address of an instruction resulting in a cache-miss condition that is equal to a target address of a previous load instruction plus a value of data loaded by a previous load instruction;

a sixth pattern having a target address of an instruction resulting in a cache-miss condition that is equal to a target address of a previous load instruction minus a value of data loaded by a previous load instruction;

a seventh pattern having a target address of an instruction resulting in a cache-miss condition that is equal to a target address of a previous store instruction plus a value of data loaded by a previous store instruction; and an eighth pattern having a target address of an instruction resulting in a cache-miss condition that is equal to a target address of a previous store instruction minus a value of data loaded by a previous load instruction.

8. The method of claim 7, further comprising:

storing pattern information for the patterns of instructions in a file, the pattern information including for each pattern of instructions a pattern type, an instruction address, an offset value, and a pattern occurrence count, wherein the pattern type indicates one of the first, second, third and fourth patterns, the instruction address is an address of one of the previous load instruction and previous store instruction, the offset value indicates a number of addresses separating the target address of the instruction resulting in the cache-miss condition from the target address of the previous load instruction and previous store instruction, and the occurrence count indicates a total number of occurrences of the pattern of instructions; and identifying as qualifying patterns of instructions from the file of pattern information, patterns of instructions in which respective ratios of pattern occurrence counts to execution counts of associated previous load instructions and associated previous store instructions are greater than a threshold value.

9. The method of claim 8, wherein the executable program is generated from a source code program, the method further comprising:

determining correspondences between the qualifying patterns and source code statements; and inserting the prefetch instructions in the executable program during compilation using the correspondences.

10. The method of claim 8, further comprising:

for each previous load instruction, storing pattern information for a number of patterns that is limited to a selected number; and for each previous store instruction, storing pattern information for a number of patterns that is limited to a selected number.

11. A computer-implemented method for inserting prefetch instructions in an executable computer program, comprising:

generating profile data of executed load instructions and store instructions, including instruction addresses, target addresses, data loaded and stored, and execution counts;

identifying from the profile data recurring patterns of instructions resulting in cache-miss conditions, wherein the patterns of instructions include, a first pattern having a target address of an instruction resulting in a cache-miss condition that is equal to a value of data loaded by a previous load instruction plus an offset value;

a second pattern having a target address of an instruction resulting in a cache-miss condition that is equal to a value of data loaded by a previous load instruction minus an offset value;

a third pattern having a target address of an instruction resulting in a cache-miss condition that is equal to a value of data stored by a previous store instruction plus an offset value; and a fourth pattern having a target address of an instruction resulting in a cache-miss condition that is equal to a value of data stored by a previous store instruction minus an offset value; and inserting prefetch instructions prior to the instructions that result in cache-miss conditions for patterns of instructions recurring more than a selected frequency.

12. The method of claim 11, further comprising:

storing pattern information for the patterns of instructions in a file, the pattern information including for each pattern a pattern type, an instruction address, an offset value, and a pattern occurrence count, wherein the pattern type indicates one of the first, second, third and fourth patterns, the instruction address is an address of one of the previous load instruction and previous store instruction, the offset value indicates a number of addresses separating the target address of the instruction resulting in the cache-miss condition from the data value of the previous load or store instruction, and the occurrence count indicates a total number of occurrences of the pattern; and identifying as qualifying patterns from the file of pattern information, patterns in which respective ratios of pattern occurrence counts to execution counts of associated previous load instructions and associated previous store instructions are greater than a threshold value.

13. The method of claim 12, wherein the executable program is generated from a source code program, the method further comprising:
determining correspondences between the qualifying patterns and source code statements; and
inserting the prefetch instructions in the executable program during compilation using the correspondences.

14. The method of claim 12, further comprising:
for each previous load instruction, storing pattern information for a number of patterns that is limited to a selected number, and
for each previous store instruction, storing pattern information for a number of patterns that is limited to a selected number.

15. The method of claim 11, wherein the patterns of instructions comprise:
a fifth pattern having a target address of an instruction resulting in a cache-miss condition that is equal to a value of data loaded by a previous load instruction plus the value of data loaded by a previous load instruction;
a sixth pattern having a target address of an instruction resulting in a cache-miss condition that is equal to a value of data loaded by a previous load instruction minus the value of data loaded by a previous load instruction;
a seventh pattern having a target address of an instruction resulting in a cache-miss condition that is equal to a value of data stored by a previous store instruction plus the value of data stored by a previous store instruction; and
an eighth pattern having a target address of an instruction resulting in a cache-miss condition that is equal to a value of data stored by a previous store instruction minus the value of data stored by a previous store instruction.

16. The method of claim 15, further comprising;
storing pattern information for the patterns of instructions in a file, the pattern information including for each pattern a pattern type, a first instruction address, a second instruction address, and a pattern occurrence count, wherein the pattern type indicates one of the first, second, third and fourth patterns, the first instruction address is an address of one of the previous load and store instructions, the second instruction address is an address of one of the previous load and store instructions, and the occurrence count indicates a total number of occurrences of the pattern; and
identifying as qualifying patterns from the file of pattern information, patterns in which respective ratios of pattern occurrence counts to execution counts of associated previous load instructions and associated previous store instructions are greater than a threshold value.

17. The method of claim 16, wherein the executable program is generated from a source code program, the method further comprising:
determining correspondences between the qualifying patterns and source code statements; and
inserting the prefetch instructions in the executable program during compilation using the correspondences.

18. The method of claim 16, further comprising:
for each previous load instruction, storing pattern information for a number of patterns that is limited to a selected number; and
for each previous store instruction, storing pattern information for a number of patterns that is limited to a selected number.

19. A computer-readable medium configured with executable instructions for causing a computer to perform the steps comprising:
generating profile data of executed load instructions and store instructions, including instruction addresses, target addresses, data loaded and stored, and execution counts;
identifying from the profile data recurring patterns of instructions resulting in cache-miss conditions, wherein the patterns of instructions include,
a first pattern having a target address of an instruction resulting in a cache-miss condition that is equal to a target address of a previous load instruction plus an offset value;
a second pattern having a target address of an instruction resulting in a cache-miss condition that is equal to a target address of a previous load instruction minus an offset value;
a third pattern having a target address of an instruction resulting in a cache-miss condition that is equal to a target address of a previous store instruction plus an offset value: and
a fourth pattern having a target address of an instruction resulting in a cache-miss condition that is equal to a target address of a previous store instruction minus an offset value; and
inserting prefetch instructions prior to the instructions that result in cache-miss conditions for patterns of instructions recurring more than a selected frequency.

20. The computer-readable medium of claim 19, further configured with executable instructions for causing a computer to perform the steps comprising:
saving profile data for a selected number of most-recently executed load instructions and store instructions; and
identifying the recurring patterns of instructions using the saved profile data while the program is executing.

21. The computer-readable medium of claim 20, further configured with executable instructions for causing a computer to perform the steps comprising:
storing profile data for each executed load instruction and store instruction; and
identifying the recurring patterns of instructions using the stored profile data after program execution is complete.

22. The computer-readable medium of claim 19, wherein the patterns of instructions further include
a fifth pattern having a target address of an instruction resulting in a cache-miss condition that is equal to a target address of a previous load instruction plus a value of data loaded by a previous load instruction;
a sixth pattern having a target address of an instruction resulting in a cache-miss condition that is equal to a target address of a previous load instruction minus a value of data loaded by a previous load instruction;
a seventh pattern having a target address of an instruction resulting in a cache-miss condition that is equal to a target address of a previous store instruction plus a value of data loaded by a previous store instruction; and
an eighth pattern having a target address of an instruction resulting in a cache-miss condition that is equal to a target address of a previous store instruction minus a value of data loaded by a previous load instruction.

23. A computer-readable medium configured with executable instructions for causing a computer to perform the steps comprising:
generating profile data of executed load instructions and store instructions, including instruction addresses target addresses data loaded an stored and execution counts;

identifying from the profile data recurring patterns of instructions resulting in cache-miss conditions, wherein the patterns of instructions include,
   a first pattern having a target address of an instruction resulting in a cache-miss condition that is equal to a value of data loaded by a previous load instruction plus an offset value;
   a second pattern having a target address of an instruction resulting in a cache-miss condition that is equal to a value of data loaded by a previous load instruction minus an offset value;
   a third pattern having a target address of an instruction resulting in a cache-miss condition that is equal to a value of data stored by a previous store instruction plus an offset value; and
   a fourth pattern having a target address of an instruction resulting in a cache-miss condition that is equal to a value of data stored by a previous store instruction minus an offset value; and
inserting prefetch instructions prior to the instructions that result in cache-miss conditions for patterns of instructions recurring more than a selected frequency.

24. The computer-readable medium of claim 23, wherein the patterns of instructions further include:

a fifth pattern having a target address of an instruction resulting in a cache-miss condition that is equal to a value of data loaded by a previous load instruction plus the value of data loaded by a previous load instruction;

a sixth pattern having a target address of an instruction resulting in a cache-miss condition that is equal to a value of data loaded by a previous load instruction minus the value of data loaded by a previous load instruction;

a seventh pattern having a target address of an instruction resulting in a cache-miss condition that is equal to a value of data stored by a previous store instruction plus the value of data stored by a previous store instruction; and an eighth pattern having a target address of an instruction resulting in a cache-miss condition that is equal to a value of data stored by a previous store instruction minus the value of data stored by a previous store instruction.

* * * * *